(12) United States Patent
Schilling

(10) Patent No.: US 6,366,605 B1
(45) Date of Patent: Apr. 2, 2002

(54) SPREAD-SPECTRUM DATA DETECTION USING MATCHED-FILTER OBTAINED SIDE INFORMATION

(75) Inventor: Donald L. Schilling, Sands Point, NY (US)

(73) Assignee: Linex Technologies, Inc., West Long Branch, NJ (US)

( * ) Notice: Subject to any disclaimer, the term of this patent is extended or adjusted under 35 U.S.C. 154(b) by 0 days.

(21) Appl. No.: 09/265,707

(22) Filed: Mar. 9, 1999

(51) Int. Cl.[7] .......................... H04B 15/00; H04K 1/00; H04L 27/30
(52) U.S. Cl. ...................... 375/147; 375/142; 375/143; 714/774; 714/751
(58) Field of Search ................................ 375/140, 142, 375/143, 150, 152, 343, 147; 708/422; 714/751, 774, 786

(56) References Cited

U.S. PATENT DOCUMENTS 5,353,301 A * 10/1994 Mitzlaff ...................... 375/200
5,623,511 A * 4/1997 Bar-David et al. .......... 375/207
6,112,325 A * 8/2000 Burshtein .................... 714/774
6,205,168 B1 * 3/2001 Somayazulu ................ 375/149

* cited by examiner

Primary Examiner—Chi Pham
Assistant Examiner—Phuong Phu
(74) Attorney, Agent, or Firm—David Newman Chartered

(57) ABSTRACT

An improvement to a spread-spectrum receiver at a bse station having a matched filter. A symbol sampler samples at the symbol time $T_s$, a symbol sample from the matched filter. A noise sampler samples at a plurality of chip times $kT_c$, but not at the symbol time $T_s$, a plurality of noise samples from the matched filter. An estimator or low-pass filter filters the plurality of noise samples from the symbol sampler, to generate a noise estimate. A combiner circuit subtracts the noise estimate from the low-pass filter from the symbol sample from the symbol sampler, thereby generating a comparison signal. A magnitude device determines a magnitude of the comparison signal. A comparator has threshold voltage applied to a threshold input. The comparator compares the magnitude of the comparison signal to the threshold voltage, thereby generating the erasure signal. An erasure decoder erasure decodes the input data using the erasure signals from the erasure detector.

16 Claims, 2 Drawing Sheets

SPREAD-SPECTRUM DATA DETECTION USING MATCHED-FILTER OBTAINED SIDE INFORMATION

BACKGROUND OF THE INVENTION

This invention relates to spread-spectrum communications in a code-division-multiple-access system, and more particularly to using side information from noise samples at an output from a matched filter at times other than a sampling time for a symbol sample, in a forward error correction decoder.

DESCRIPTION OF THE RELEVANT ART

In a direct-sequence (DS) code-division-multiple-access (CDMA) system having a base station and a plurality of remote stations transmitting to the base station, the spread-spectrum signals from many of the remote stations arrive at the base station simultaneously. The spread-spectrum signal from each remote station may arrive at the base station with a different power level with different symbol and chip arrival times. Further, the desired spread-spectrum signal at a particular spread-spectrum receiver receiving a particular spread-spectrum channel from a particular remote station, may be fading, and is, on occasion, not detectable, or has a high error rate.

Diversity coding, forward-error-correction (FEC) decoding, and interference cancellation are approaches to reducing the error rates. RAKE may be used to combine the strongest signal paths in a fading or multipath environment. These approaches do not, in general, take advantage of the unique noise environment of a DS-CDMA system, in which noise, on the average, is due to the multiple spread-spectrum signals from the plurality of remote stations.

SUMMARY OF THE INVENTION

A general object of the invention is to reduce error rate in a direct-sequence code-division-multiple-access (DS-CDMA) spread-spectrum system.

According to the present invention, as embodied and broadly described herein, an improvement to a spread-spectrum receiver at the base station in a direct-sequence code-division-multiple-access (DS-CDMA) system is provided. The DS-CDMA system has a plurality of spread-spectrum signals arriving from a plurality of remote stations, respectively. Each spread-spectrum signal in the plurality of spread-spectrum signals has a chip-sequence signal lasting a symbol time $T_s$. Each remote user may be operating at a different symbol time $T_{si}$, where i is an index for the different symbol time. Each chip-sequence signal is different, due to a different chip sequence, from other chip-sequence signals used by other spread-spectrum signals in the plurality of spread-spectrum signals.

Each spread-spectrum receiver at the base station includes a matched filter having an impulse response matched to a desired chip-sequence signal in the plurality of chip-sequence signals. The matched filter detects a desired spread-spectrum signal in the plurality of spread-spectrum signals arriving at the spread-spectrum receiver at the base station. The desired spread-spectrum signal is spread-spectrum processed with a desired chip-sequence signal. The desired spread-spectrum signal is the particular spread-spectrum signal for which data detection is sought.

The improvement comprises a symbol sampler, a noise sampler, an estimator or a low-pass filter, a combiner circuit, a magnitude device, a comparator and an erasure decoder.

The symbol sampler samples at a plurality of symbol times $nT_s$, a plurality of symbol samples from the desired matched filter. The integer n indexes the plurality of symbol times. Each symbol sample has time duration $T_s$.

For each symbol sample, the noise sampler samples at a plurality of chip times $kT_c$, but not at the plurality of symbol times $nT_s$, a plurality of noise samples from the matched filter. A plurality of noise samples is associated, or correspond, with each symbol sample. The estimator estimates a noise estimate from the plurality of noise samples. The low-pass filter filters the plurality of noise samples from the noise sampler, to generate an estimate of the noise. Each estimtate of the noise is denoted hereinafter as "noise estimate". The combiner circuit subtracts the noise estimated outputted from the low-pass filter, from the symbol sample, outputted from the symbol sampler, thereby generating a comparison signal. The magnitude device determines a magnitude of the comparison signal.

The comparator has a threshold voltage applied to a threshold input. The comparator compares the magnitude of the comparison signal to the threshold voltage. If the magnitude of the comparison signal fell below the threshold, then the comparartor outputs the erasure signal.

The erasure decoder decodes the symbols from the symbol sampler when the erasure signal is present from the comparator, as is well known in the art.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings.

The present invention provides an improvement to a spread-spectrum receiver in a direct-sequence code-division-multiple-access (DS-CDMA) system. The DS-CDMA system is assumed to have a base station and a plurality of remote stations. At the base station a plurality of spread-spectrum signals arrive from the plurality of remote stations.

The present invention is anticipated to be implemented with a digital signal processor (DSP) or application specific integrated circuit (ASIC). The means plus functions, and their embodiment as a "device", "detector", "decoder"and/ or "estimator", include the digital signal processor or application specific integrated circuit with software. Thus, a device, detector, decoder, and/or estimator, may be a part or a portion of a digital signal processor or ASIC, and software.

Each spread-spectrum signal in the plurality of spread-spectrum signals has a chip-sequence signal lasting a symbol time $T_s$. Each remote user may be operating at a different symbol time $T_{si}$, where i is an index for the different symbol time. Each chip-sequence signal in the plurality of chip-sequence signals is different from other chip-sequence signals used by other spread-spectrum signals in the plurality of spread-spectrum signals. Each chip-sequence signal is different since a different chip sequence is used for each chip-sequence signal in the plurality of chip-sequence signals.

Figure 1:
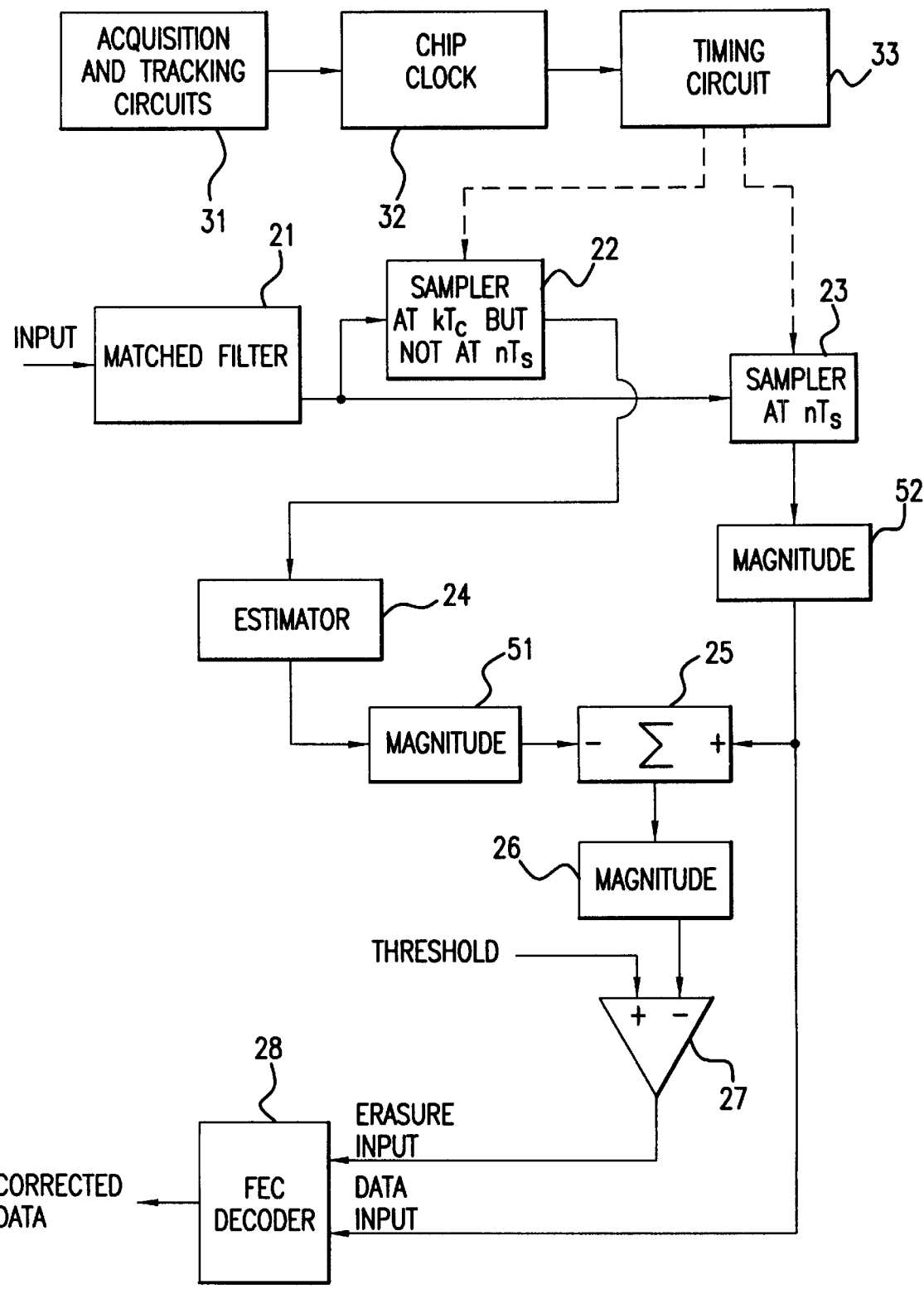
FIG. 1 is a block diagram for spread-spectrum data detection using matched filter side information.

In the exemplary arrangement shown in FIG. 1, the spread-spectrum receiver includes despreading means, which may be embodied as a matched filter 21. The matched filter 21 has an impulse response matched to a desired chip-sequence signal in the plurality of chip-sequence signals. The matched filter 21 detects a desired spread-spectrum signal in the plurality of spread-spectrum signals arriving at the spread-spectrum receiver. In general, the matched filter 21 is for a complex signal, that is, signals having an in-phase component and a quadrature-phase component. Designing a particular embodiment for a complex signal is anticipated by the present invention. References to the various signals, symbols and estimate, in this disclosure includes embodiments as a complex signal, to embodiments as a real signal, i.e., a real component of a complex signal, and to embodiments as a magnitude of a complex signal.

While the matched filter is the preferred embodiment, the despreading means may be embodied as a correlator. The correlator would include a chip-sequence generator, for generating a chip-sequence signal matched to the desired chip-sequence signal in the plurality of chip-sequence signals.

The invention includes sampler means, estimate means, comparator means, and an erasure decoder 28. The sampler means is coupled to the matched filter 21. The estimate means is coupled to the sampler means. The comparator means is coupled to the estimate means. The erasure decoder 28 has an erasure input coupled to the comparator means and a data input coupled to the sampler means.

Figure 2:
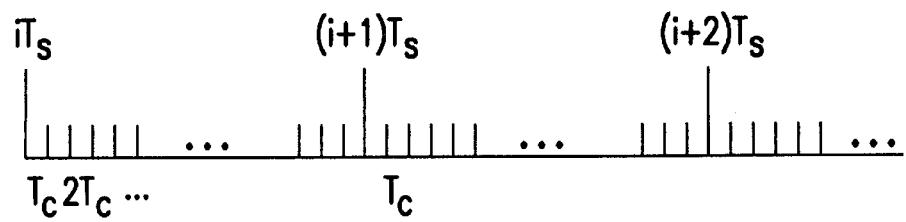
FIG. 2 shows sampling at chip time $T_c$ and symbol time $T_s$.

The sampler means samples, as shown in FIG. 2, at a plurality of symbol times $nT_s$, the plurality of symbol samples from the matched filter 21. The plurality of symbol times $nT_s$ is the time occurrence of the plurality of symbol samples, and repeats every symbol time $T_s$. The integer n is an index to each symbol time.

Figure 3:
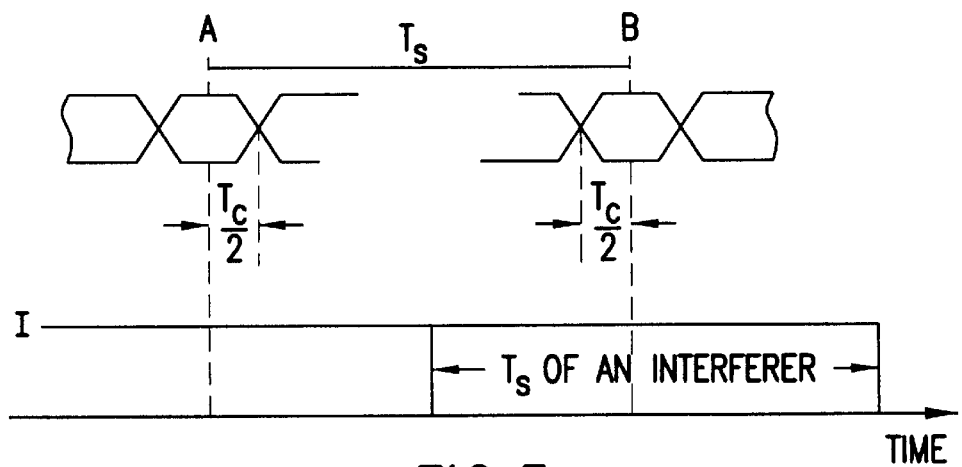
FIG. 3 shows average noise power during a symbol time $T_s$.

The sampler means samples, for each symbol sample, at a plurality of chip times $kT_c$, but not at a plurality of symbol times $nT_s$, a plurality of noise samples, from the matched filter 21. The chip time $T_c$ is the time duration of a chip, and repeats every $T_c$. The sequence of chip times is indexed by factor k. The sampling of the plurality of noise samples may occur before, after, or a combination of before and after, the sampling at each symbol time for each symbol sample. FIG. 3 shows that the symbol sample for a particular sequence of symbols may be non-synchronous for symbol samples for other sequences of symbol samples, from other spread-spectrum channels.

The estimate means estimates, or filters, a plurality of noise samples from the sampler means, to generate a noise estimate. The noise estimate may be a low-pass filtered version of the plurality of noise samples. Alternatively, using a digital signal processor embodiment or application specific integrated circuit (ASIC) embodiment, the estimate means may use a mathematical algorithm for estimating noise estimate. The mathematical algorithm may include, but is not limited to, straight averaging; root means square (RMS) averaging; and determining a median value in the plurality of noise samples.

The comparator means compares the noise estimate with the symbol sample, to generate an erasure signal. In general, this comparator means may be generated in a number of ways. The comparison may generate a ratio of the symbol sample to the noise estimate, and compare the SNR to a threshold. Alternatively, the comparison may subtract the noise estimate from the symbol sample, and compare the difference to a threshold. The erasure condition might occur when the ratio of the particular symbol sample to the noise estimate, an SNR, is below a threshold, or when the difference between the symbol sample corresponding to the noise estimate is below the threshold.

The erasure decoder 28 may be a FEC decoder, and has an erasure input and a data input. The erasure input is coupled to the comparator means, and the data input is coupled to the sampler means. The erasure decoder 28 erasure decodes the symbol sample using the erasure signal. Typically, the comparator means compares the power or energy of the symbol sample to the noise estimate. The comparison may be a ratio or subtraction. A ratio would be equivalent to a SNR or symbol energy to noise ratio, $E_b/N_o$. Subtraction would be a difference between signal power or energy, and average noise power. The comparator means compares the SNR or $E_b/N_o$, or the difference between the symbol sample and noise estimate, to a threshold. If the SNR or $E_b/N_o$ were below a threshold, then a plurality of an error is indicated by an erasure signal from the comparator means. If the difference level is below a threshold, then an error is indicated by an erasure signal from the comparator means.

As illustratively shown in FIG. 1, the sampler means may include a noise sampler 22 and symbol sampler 23. The symbol sampler 23 is coupled to the matched filter 21. The symbol sampler 23 samples at a plurality of symbol times $nT_s$, a plurality of symbol samples. In a typical embodiment employing a digital signal processor or an application specific integrated circuit (ASIC), the symbol sampler 23 might be a gate, for gating the symbol sample from the matched filter 21. The timing for sampling with the gate comes from timing circuit 33.

The noise sampler 22 is coupled to the matched filter 21. The noise sampler 22 typically is a gate for gating the output data signal from the matched filter 21. The gating is the sampling of the digital output of the matched filter 21. The noise sampler 22 samples, as illustrated in FIGS. 2 and 3, for each symbol sample, at the plurality of chip times $kT_c$, but not at the plurality of symbol times $nT_s$, the plurality of noise samples. The sampling of the plurality of noise samples may occur before, after, or a combination of before and after, sampling of the corresponding symbol sample.

Timing for the noise sampler 22 and for the symbol sampler 23 may be derived from acquisition and tracking circuits 31 of the spread-spectrum receiver. The acquisition and tracking circuits may derive timing from a header portion of a packet signal, or from a separate synchronization channel. The acquisition and tracking circuits 31 generate timing which controls a chip clock 32 for the desired spread-spectrum signal to be received. The timing circuit 33, based on timing from the chip clock 32, generates appropriate timing signals for triggering sampling of noise sampler 22 and symbol sampler 23.

The estimate means may be embodied as an estimator 24, such as a register or memory circuit, for processing the plurality of noise samples. The processing may include storing and averaging the plurality of noise samples. The estimate means may be embodied as a low pass filter, or an algorithm for computing or determining an average. The algorithm may be, by way of example, root means square averaging, means square averaging, straight averaging, weighted averaging, determining a median value, or other mathematical noise estimating algorithm. At the output of the estimator 24 is the filtered output, referred hereinafter as "noise estimate".

The comparator means may include a combiner circuit 25, a magnitude device 26, and a comparator 27. The combiner 25 is coupled to the estimate means, and more particularly, as shown in FIG. 1, to the estimator 24. The magnitude device 26 is coupled to the combiner circuit 25. The comparator 27 is coupled to the magnitude device 26 and to the erasure decoder 28.

The combiner circuit 25 subtracts the noise estimate from the symbol sample. The output of the combiner circuit 25 is denoted as "comparison signal". The combiner circuit 25 alternatively may determine a ratio of the symbol sample and the noise estimate, to generate a SNR value or $E_b/N_o$ value. As the comparison signal.

The magnitude device 26 determines a magnitude of the comparison signal. The comparator 27 has a threshold voltage applied to a threshold input. The comparator 27 compares the magnitude of the comparison signal to the threshold voltage, and thereby generates the erasure signal. The erasure signal indicates when the criterion is not met from the comparison, to erase the corresponding symbol sample.

The erasure decoder 28 erasure decodes each decoded-symbol sample, using a corresponding erasure signal. Typically, if the erasure signal from the comparator 27 indicated a high probability of error, that is, the signal level falls between levels $\Delta_1$ and $\Delta_2$ in FIG. 5, then the erasure decoder 28 employs this added information when processing the syndrome formed in the FEC decoder. FEC erasure decoders are well known in the art and can be purchased commercially.

The present invention additional may have a noise-magnitude device 51 and symbol-magnitude device 52, for determining a magnitude of the noise estimate and of the symbol sample, respectively. With the noise-magnitude device 51 and the symbol-magnitude device 52, the combiner circuit 25 subtracts the magnitude of the noise estimate from the magnitude of the symbol sample to generate the comparison signal. Alternately, the combiner circuit 25 determines a ratio of the magnitude of the symbol sample to the magnitude of the noise estimate.

Figure 4:
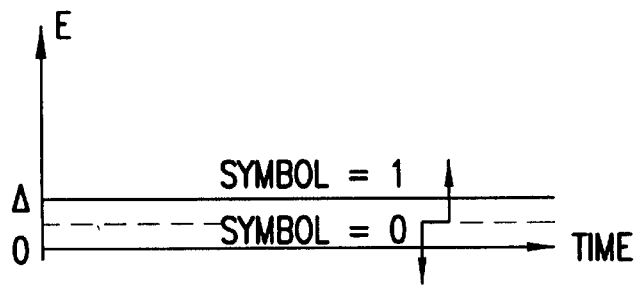
FIG. 4 shows a threshold between a 1 bit and 0 bit.
Figure 5:
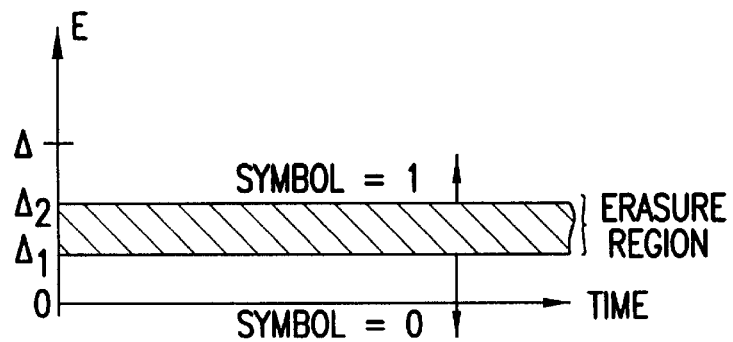
FIG. 5 shows an erasure region.

FIG. 4 illustrates detection between a symbol=1 and a symbol=0, without erasure decoding, by comparing the output of the matched filter 21 to a threshold. FIG. 5 illustrates detection between a symbol=1 and a symbol=0, with erasure decoding. With erasure decoding, there is an in-between region, where an error has a likelihood of occurring. The comparison of the symbol sample and the noise estimate might be from a signal-to-interferenceratio (SIR) or energy ratio, and if the SIR for the particular symbol sample and noise estimate failed to cross a threshold, then the erasure signal indicates to erasure decode the particular symbol sample. The criterion also may be based on the energy of the symbol sample, and noise estimate, or from subtracting the noise estimate from the symbol sample.

Other algorithms or criteria may be used, based on the symbol sample and the noise estimate, to determine if the symbol sample were to be erasure decoded.

In use, a plurality of spread-spectrum signals arrive at the input to the receiver. The matched filter 21 detects the desired spread-spectrum signal from the plurality of spread-spectrum signals, by having an impulse response matched to the desired chip-sequence signal. At the output of the matched filter, the symbol sampler 23 samples at each symbol time, $nT_s$, to generate a plurality of symbol samples. The noise sampler 22, for each symbol sample, samples at a plurality of chip times $kT_c$, to generate a plurality of noise samples. The estimator averages or filters, for each symbol sample, the plurality of noise samples, to generate a noise estimate.

Optionally, a magnitude may be determined for each symbol sample by the symbol-magnitude device 52, and for each noise estimate by the noise-magnitude device 51. The combiner 25 subtracts the noise estimate from the corresponding symbol sample to generate the comparison signal. If the magnitudes are employed, then the combiner 25 subtracts the magnitude of the noise estimate from the magnitude of the corresponding symbol sample to generate the comparison signal. A magnitude is determined from the comparison signal by magnitude device 26. The magnitude of the comparison signal is compared to a threshold by comparator 27. If the magnitude of the comparison signal fell below the threshold, then the erasure signal is outputted, to indicate an erasure. The erasure signal is fed to the erasure input of the FEC decoder 28. The symbol sample, or magnitude of the symbol sample, is fed to the data input of the FEC decoder 28. If the erasure signal were present to erase the symbol sample, then the symbol sample is erased at the FEC decoder 28 input.

The invention also includes a method for improving a spread-spectrum receiver in a DS-CDMA system. The DS-CDMA system has a plurality of spread-spectrum signals arriving from a plurality of remote stations. Each spread-spectrum signal in the plurality of spread-spectrum signals has a chip-sequence signal lasting a symbol time $T_s$. The chip-sequence signal is different from other chip-sequence signals used by other spread-spectrum signals in the plurality of spread-spectrum signals. The spread-spectrum receiver includes a matched filter having an impulse response matched to a desired chip-sequence signal in the plurality of chip-sequence signals, for detecting a desired spread-spectrum signal in the plurality of spread-spectrum signals arriving at the spread-spectrum receiver. The method comprises the steps of sampling at the symbol time $T_s$, a symbol sample; sampling at a plurality of chip times $kT_c$, but not at the symbol time $T_s$, a plurality of noise samples; estimating, from the plurality of noise samples, a noise estimate; comparing the noise estimate with the symbol sample, to generate an erasure signal; and erasure decoding the symbol sample using the erasure signal.

The step of estimating may include the step of low-pass filtering the plurality of noise samples, to generate a noise estimate.

The step of comparing may include the steps of subtracting the noise estimate from the symbol sample, thereby generating a comparison signal; determining a magnitude of the comparison signal; and comparing the magnitude of the comparison signal to the threshold voltage, thereby generating the erasure signals. Erasure decoding is well known in the art.

It is apparent to those skilled in the art that various modifications can be made to detecting spread-spectrum data using matched-filter obtained side information of the instant invention without departing from the scope or spirit of the invention, and it is intended that the present invention cover modifications and variations of detecting spread-spectrum data using matched-filter obtained side information provided they come within the scope of the appended claims and their equivalents.

I claim:

1. An improvement to a spread-spectrum receiver at a base station in a direct-sequence code-division-multiple-access (DS-CDMA) system having a plurality of spread-spectrum signals with each spread-spectrum signal in the plurality of spread-spectrum signals having a chip-sequence signal lasting a symbol time $T_s$, and with each chip-sequence signal different from other chip-sequence signals used by other spread-spectrum signals in the plurality of spread-spectrum signals, with the spread-spectrum receiver including despreading means for detecting a desired spread-spectrum signal in the plurality of spread-spectrum signals arriving at the spread-spectrum receiver, the improvement comprising:

a symbol sampler, coupled to said matched filter, for sampling at a plurality of symbol times $nT_s$, where n is an index to each symbol time, a plurality of symbol samples;

a noise sampler, coupled to said matched filter, for sampling a plurality of noise samples at any of before, after, and a combination of before and after each symbol sample, at a plurality of chip times $kT_c$, where k is an index of each chip time Tc, but not at the plurality of symbol $nT_s$;

a low-pass filter, coupled to said noise sampler, for filtering the plurality of noise samples, to generate a noise estimate corresponding to a particular symbol sample in the plurality of symbol samples;

a combiner circuit, coupled to said low-pass filter and to said symbol sampler, for subtracting the noise estimate from the particular symbol sample, thereby generating a comparison signal;

a magnitude device, coupled to said combiner circuit, for determining a magnitude of the comparison signal; and a comparator, coupled to said magnitude device and having a threshold voltage applied to a threshold input, for comparing the magnitude of the comparison signal to the threshold voltage, thereby generating the erasure signal; and an erasure decoder, having an erasure input coupled to said comparator and a data input coupled to said symbol sampler, responsive to the erasure signal for erasure decoding the symbol sample.

2. An improvement to a spread-spectrum receiver in a direct-sequence code-division-multiple-access (DS-CDMA) system having a plurality of spread-spectrum signals with each spread-spectrum signal in the plurality of spread-spectrum signals having a chip-sequence signal lasting a symbol time $T_s$, and with each chip-sequence signal different from other chip-sequence signals used by other spread-spectrum signals in the plurality of spread-spectrum signals, with the spread-spectrum receiver including despreading means for detecting a desired spread-spectrum signal in the plurality of spread-spectrum signals arriving at the spread-spectrum receiver, the improvement comprising:

sampler means, coupled to said matched filter, for sampling at a plurality of symbol times $nT_s$, where n is an index of each symbol time, a plurality of symbol samples;

said sampler means for sampling at any of before, after, or a combination of before and after each symbol sample from a plurality of symbol samples, at a plurality of chip times $kT_c$, where k is an index of each chip time Tc, but not at the plurality of symbol times $nT_s$, a plurality of noise samples;

estimate means, coupled to said sampler means, for processing, from the plurality of noise samples, a noise estimate corresponding to the particular symbol sample;

comparator means, coupled to said estimate means, for comparing the noise estimate with the particular symbol sample, to generate an erasure signal; and an erasure decoder, having an erasure input and a data input, with the erasure input coupled to the said comparator means, and with the data input coupled to said sampler means, for erasure decoding the symbol sample using the erasure signal.

3. The improvement as set forth in claim 2 with said sampler means including:

a noise sampler, coupled to said matched filter, for sampling at the plurality of chip times $kT_c$, but not at the plurality of symbol times $nT_c$, the plurality of noise samples; and a symbol sampler, coupled to said matched filter, for sampling at the plurality of symbol times $nT_s$, the plurality of symbol samples.

4. The improvement as set forth in claim 2, with said estimate means including a low-pass filter, coupled to said sampler means, for filtering the plurality of noise samples, to generate the noise estimate.

5. The improvement as set forth in claim 3, with said estimate means including a low-pass filter, coupled to said noise sampler, for filtering the plurality of noise samples, to generate the noise estimate.

6. The improvement as set forth in claim 2, with said comparator means including:

a combiner circuit, coupled to said estimate means and to said sampler means, for subtracting the noise estimate from the symbol sample, thereby generating a comparison signal;

a magnitude device, coupled to said combiner circuit, for determining a magnitude of the comparison signal; and a comparator, coupled to said magnitude device and to said erasure decoder, and having a threshold voltage applied to a threshold input, for comparing the magnitude of the comparison signal to the threshold voltage, thereby generating the erasure signal.

7. The improvement as set forth in claim 3, with said comparator means including:

a combiner circuit, coupled to said estimate means and to said symbol sampler, for subtracting the noise estimate from the symbol sample, thereby generating a comparison signal;

a magnitude device, coupled to said combiner circuit, for determining a magnitude of the comparison signal; and a comparator, coupled to said magnitude device and to said erasure decoder, and having a threshold voltage applied to a threshold input, for comparing the magnitude of the comparison signal to the threshold voltage, thereby generating the erasure signal.

8. The improvement as set forth in claim 1, further including:

a noise-magnitude device, coupled between said low-pass filter and said combiner circuit, for determining a magnitude of the noise estimate;

a symbol-magnitude device, coupled between said symbol sampler and said combiner circuit, for determining a magnitude of the symbol sample; and said combiner circuit for subtracting the magnitude of the noise estimate from the magnitude of the symbol sample, thereby generating the comparison signal.

9. The improvement as set forth in claim 2, further including:

a noise-magnitude device, coupled between said estimate means and said comparator means, for determining a magnitude of the noise estimate;

a symbol-magnitude device, coupled between said sampler means and said comparator means, for determining a magnitude of the symbol sample; and said combiner circuit for subtracting the magnitude of the noise estimate from the magnitude of the symbol sample, thereby generating the comparison signal.

10. A method for improving a spread-spectrum receiver in a direct-sequence code-division-multiple-access (DS-CDMA) system having a plurality of spread-spectrum signals with each spread-spectrum signal in the plurality of spread-spectrum signals having a chip-sequence signal lasting a symbol time $T_s$, and with each chip-sequence signal different from other chip-sequence signals used by other spread-spectrum signals in the plurality of spread-spectrum signals, with the spread-spectrum receiver including despreading means for detecting a desired spread-spectrum signal in the plurality of spread-spectrum signals arriving at the spread-spectrum receiver, the improvement comprising the steps of:

sampling at a plurality of symbol times $nT_s$, where n is an index of each time, a plurality of symbol samples;

sampling, for each symbol sample, at a plurality of chip times $kT_c$, where k is an index of each chip time Tc, but not at the plurality of symbol times $nT_s$, a plurality of noise samples;

processing the plurality of noise samples, to generate a noise estimate;

subtracting the noise estimate from the symbol sample, thereby generating a comparison signal;

determining a magnitude of the comparison signal;

comparing the magnitude of the comparison signal to a threshold voltage, thereby generating the erasure signal; and erasure decoding a plurality of symbol samples using a plurality of erasure signals.

11. A method for improving a spread-spectrum receiver in a direct-sequence code-division-multiple-access (DS-CDMA) system having a plurality of spread-spectrum signals with each spread-spectrum signal in the plurality of spread-spectrum signals having a chip-sequence signal lasting a symbol time $T_s$, and with each chip-sequence signal different from other chip-sequence signals used by other spread-spectrum signals in the plurality of spread-spectrum signals, with the spread-spectrum receiver including despreading means for detecting a desired spread-spectrum signal in the plurality of spread-spectrum signals arriving at the spread-spectrum receiver, the improvement comprising the steps of:

sampling at a plurality of symbol times $nT_s$, where n is an index of each symbol time, a plurality of symbol samples;

sampling, for each symbol sample, at a plurality of chip times $kT_c$, where k is an index of each chip time Tc, but not at the plurality of symbol times $nT_s$, a plurality of noise samples;

estimating, from the plurality of noise samples corresponding to a particular symbol sample, a noise estimate;

comparing the noise estimate with the symbol sample, to generate an erasure signal; and erasure decoding the symbol sample using the erasure signal.

12. The method as set forth in claim 11, with the step of estimating including the step of low-pass filtering the plurality of noise samples, to generate a noise estimate.

13. The method as set forth in claim 11, with the step of comparing including the steps of:

subtracting the noise estimate from the symbol sample, thereby generating a comparison signal;

determining a magnitude of the comparison signal; and comparing the magnitude of the comparison signal to the threshold voltage, thereby generating the erasure signal.

14. The method as set forth in claim 12, with the step of comparing including the steps of:

subtracting the noise estimate from the symbol sample, therby generating a comparison signal;

determining a magnitude of the comparison signal; and comparing the magnitude of the comparison signal to the threshold voltage, thereby generating the erasure signal.

15. The method as set forth in claim 10, further including the step of:

determining a magnitude of the noise estimate;

determining a magnitude of the symbol sample; and subtracting the magnitude of the noise estimate from the magnitude of the symbol sample, thereby generating the comparison signal.

16. The method as set forth in claim 11, further including the step of:

determining a magnitude of the noise estimate;

determining a magnitude of the symbol sample; and subtracting the magnitude of the noise estimate from the magnitude of the symbol sample, thereby generating the comparison signal.

* * * * *